Sept. 7, 1965 H. MIEDEMA 3,205,496

SIGNAL TRANSMITTING AND RECEIVING SYSTEM

Filed April 6, 1962

7 Sheets-Sheet 1

INVENTOR
H. MIEDEMA
BY [signature]
ATTORNEY

INVENTOR
H. MIEDEMA
BY
G. E. Hirsch Jr.
ATTORNEY

Sept. 7, 1965 H. MIEDEMA 3,205,496

SIGNAL TRANSMITTING AND RECEIVING SYSTEM

Filed April 6, 1962 7 Sheets-Sheet 3

INVENTOR
H. MIEDEMA
BY
ATTORNEY

INVENTOR
H. MIEDEMA
BY G. E. Hirsch Jr.
ATTORNEY

INVENTOR
H. MIEDEMA
BY G. E. Hirsch Jr.
ATTORNEY

SIGNAL TRANSMITTING AND RECEIVING SYSTEM

Filed April 6, 1962 7 Sheets-Sheet 6

INVENTOR
H. MIEDEMA
BY G. E. Hirsch Jr.
ATTORNEY

Sept. 7, 1965 H. MIEDEMA 3,205,496

SIGNAL TRANSMITTING AND RECEIVING SYSTEM

Filed April 6, 1962 7 Sheets-Sheet 7

INVENTOR
H. MIEDEMA
BY
G. E. Hirsch, Jr.
ATTORNEY

United States Patent Office 3,205,496
Patented Sept. 7, 1965

3,205,496
SIGNAL TRANSMITTING AND RECEIVING SYSTEM

Hotze Miedema, Mendham, N.J., assignor to Bell Telephone Laboratories, Incorporated, New York, N.Y., a corporation of New York Filed Apr. 6, 1962, Ser. No. 185,725
13 Claims. (Cl. 343—17.2)

This invention relates to signal transmitting and receiving systems, and in particular to radar systems having high resolution in both range and velocity.

One of the most important characteristics of a radar system is its resolution capability, that is, the ability to discriminate between a multiplicity of objects having one or more parameters of approximately the same value. Thus, in the case of a radar system that determines the range or distance of an object from the origin of the radar system frame of reference, the range resolution characteristic of the system expresses the ability of the system to determine the individual ranges of multiple objects which are located in close proximity to one another independent of their radial velocity. Similarly, in the case of a radar system that determines the velocity of an object in a radial direction to or from the origin of the radar system frame of reference, the so-called Doppler resolution of the system expresses the ability of the system to determine the individual radial velocities of multiple objects which have approximately the same radial velocities independent of their distance from the origin of the radar system frame of reference.

Although there are a number of radar systems possessing high range resolution, for example, the so-called chirp radar system described by J. R. Klauder, A. C. Price, S. Darlington, and W. J. Albersheim in "The Theory and Design of Chirp Radars," volume 39, Bell System Technical Journal, page 745 (1960), there is a need for radar systems having unambiguous high range resolution and high Doppler resolution. That is, many of these systems suffer from range-Doppler ambiguities. The indicated range of an object depends upon its radial velocity and vice versa, and the ability to resolve two objects in both range and Doppler shift disappears when a predetermined relation exists between their range and Doppler shift difference. One of the chief obstacles in designing systems having unambiguous high range and high Doppler resolution is the fundamental conflict between the requirements necessary for attaining simultaneously each type of resolution, since high range resolution requires a radar signal having a relatively wide frequency spectrum, whereas high Doppler resolution requires a radar signal having a relatively narrow frequency spectrum. In addition, it is highly desirable that a radar signal which yields both high range resolution and high Doppler resolution have characteristics which permit efficient use of existing, well developed radar equipment. For example, a radar signal that provides unambiguous high range and high Doppler resolution is proposed by J. R. Klauder in "The Design of Radar Signals Having Both High Range Resolution and High Velocity Resolution," volume 39, Bell System Technical Journal, page 809 (1960), but it is pointed out in the article that this signal does not have a waveform of uniform amplitude suitable for efficient transmission by existing radar systems.

In the radar system of this invention, however, there is provided a radar signal that not only yields unambiguous high resolution in both range and velocity, but also has characteristics that make it well suited for use in a system employing available radar components. The design of the radar system of this invention is based upon the recognition that although a wide frequency spectrum is necessary for good range resolution and a narrow frequency spectrum is necessary for good Doppler resolution, these conflicting requirements on the frequency spectrum of a radar signal do not have to be met simultaneously. In particular, high Doppler resolution is recognized as requiring a narrow frequency spectrum only for a transmitted radar signal, while high range resolution is recognized as requiring a wide frequency spectrum only after the transmitted radar signal has been reflected and received in order to produce suitable narrow pulses at the receiver. This discovery is applied in the present invention by transmitting a pulse-type radar signal whose frequency spectrum is characterized by a number of relatively narrow subspectra, where the spacing in frequency between adjacent subspectra is determined by the extent of the anticipated variation in velocities of the objects to be detected. Since the Doppler resolution of the transmitted signal is determined by the widths of the individual subspectra, the subspectra are made sufficiently narrow to yield high Doppler resolution. After reflection and reception, the spacing in frequency between adjacent subspectra is reduced to obtain a single continuous spectrum of sufficient width to satisfy the requirement for high range resolution. In addition to yielding high range and high Doppler resolution, the characteristics of both the transmitted signal and the received signal are well suited to generation and processing by presently known radar components. Further, the dispersion of the subspectra of the transmitted signal over widely separated frequencies makes the transmitted signal more difficult to jam than conventional radar signals having a wide, continuous spectrum.

The invention will be fully understood from the following detailed description of the invention as employed in a number of practical radar systems which are illustrated in the appended drawings. In the drawings.

*Theoretical considerations*

Figure 1:
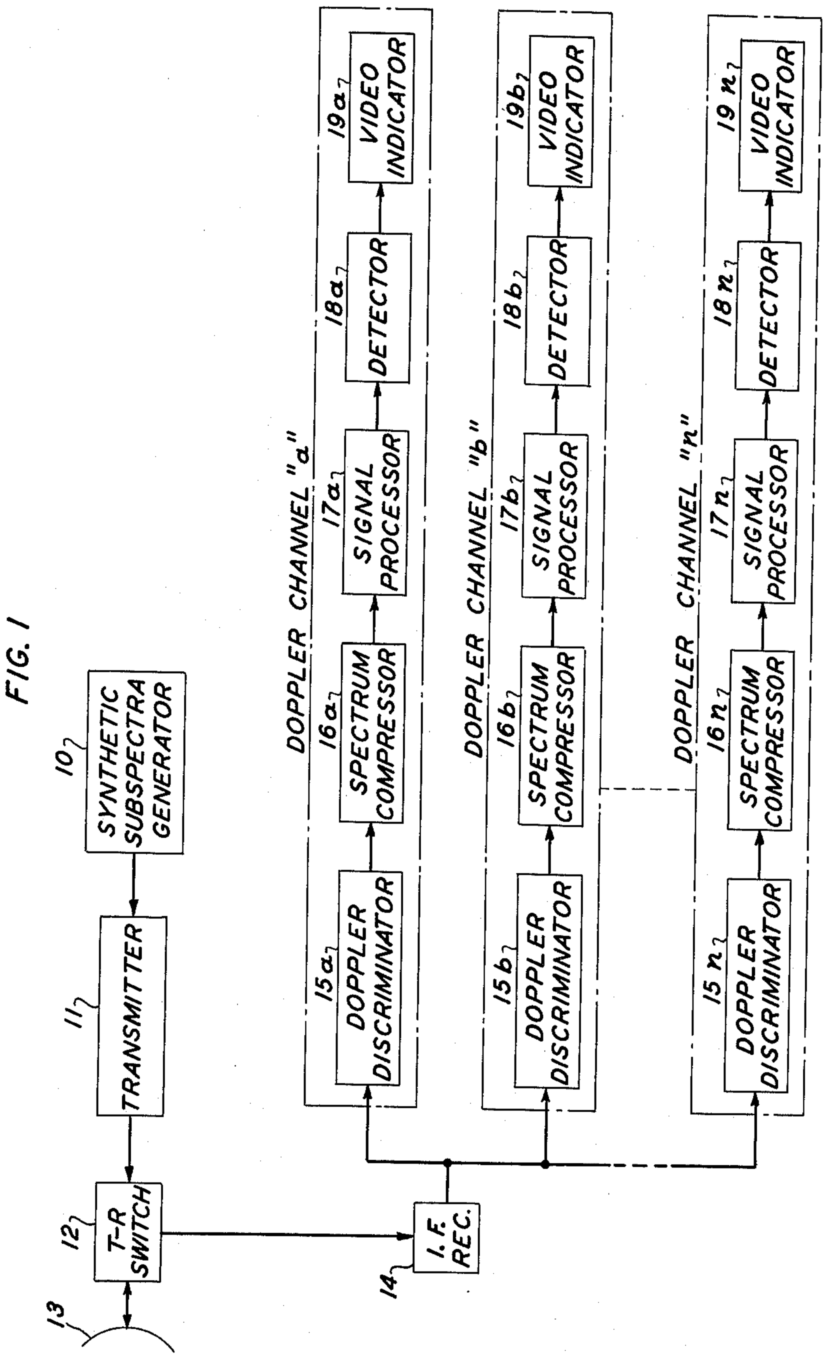
FIG. 1 illustrates in block schematic form a general application of this invention in a radar system.

One measure of the performance of a radar system is its ability to provide unambiguous range and velocity information, that is, its ability to determine both range and velocity of a target, the measured target range being independent of target velocity and the measured target velocity being independent of target range. As pointed out in the above-mentioned article on chirp radar systems, objects that are separated in range by a distance $\Delta R$ can be resolved by a radar system only if $$\Delta R \geq \frac{c}{2W} \quad (1)$$

where $c$ is the velocity of propagation of the radar signal and W is the width of the frequency spectrum of the radar signal. From Equation 1 it is evident that the wider the spectrum, the smaller the range separation between resolvable objects. On the other hand, objects that are separated in velocity by an amount $\Delta V$ can be resolved by a radar system provided that $$\Delta V \geq \frac{c}{2f_c} \cdot W \quad (2)$$

where $f_c$ is the carrier frequency of the radar signal. From Equation 2 it is evident that the narrower the spectrum, the smaller the velocity separation between resolvable objects. It is therefore observed that Equations 1 and 2 prescribe conflicting requirements on the width of the frequency spectrum for achieving both high range resolution and high Doppler resolution.

In addition to the resolution capability of a radar system, another measure of the performance of a radar system is the range at which the system is able to detect distant objects. The range coverage of a radar system is directly dependent upon the energy transmitted per pulse; the higher the energy transmitted, the greater the range of detectable objects. Since practical considerations usually limit the transmitter output power, the energy per pulse can only be increased by increasing the time duration of each transmitted pulse. The increase in detection range achieved in this manner is offset by the accompanying decrease in range resolution that results from increasing pulse duration.

Detection of objects at long ranges and with good range and velocity resolution therefore presents conflicting requirements for the characteristics of the radar signal. One set of conflicting requirements, namely, increased signal duration and increased bandwidth, has been solved by the chirp radar system referred to above. In a conventional chirp system, the short pulse required for the desired range resolution is replaced by a long, frequency modulated pulse with equivalent spectral width. In this manner the energy per pulse is increased with no change in range resolution. After reflection from a distant object, the long duration pulse is compressed in time to produce a short duration signal having a relatively large amplitude, thereby providing high range resolution in addition to long range detection.

The conventional chirp system, however, does not provide a solution to the problem of obtaining unambiguous range and Doppler information.

In the present invention there is provided a radar system that has long range detection capability and which provides unambiguous range and Doppler information with good range resolution and good velocity resolution by constructing a radar signal with characteristics that satisfy the requirements necessary to attain these capabilities. The construction of a radar signal having characteristics that satisfy the above-mentioned requirements is based upon the discovery that these requirements do not need to be satisfied simultaneously; specifically, at the transmitter of the present invention there is generated a radar signal having a waveform and a spectrum which respectively satisfy the requirements for long range detection and unambiguous good velocity resolution, whereas at the receiver of the present invention there is constructed from the reflected radar signal a signal having a spectrum that satisfies the requirement for good range resolution. The following discussion will explain graphically and in detail the characteristics of the radar signal of this invention.

Figure 4B:
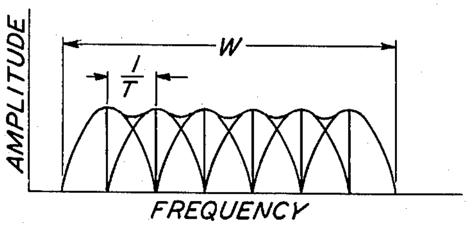
FIGS. 4A through 4M are diagrams of various signal characteristics which are of assistance in explaining the operation of the apparatus of this invention.
Figure 4C:
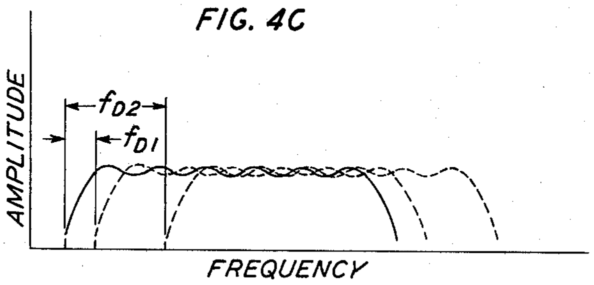
Figure 4D:
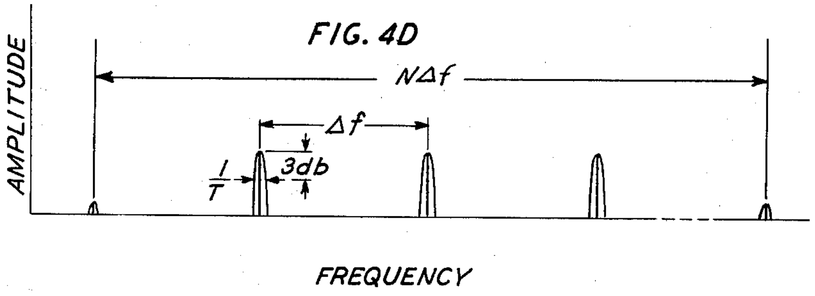
Figure 4E:
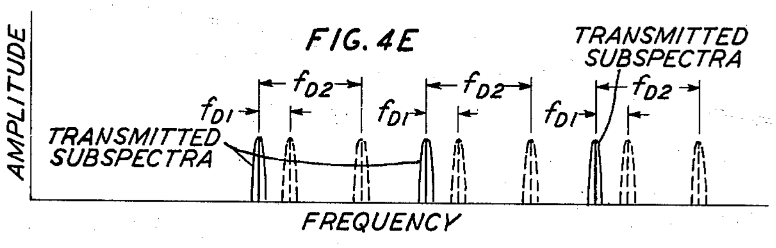
Figure 4A:
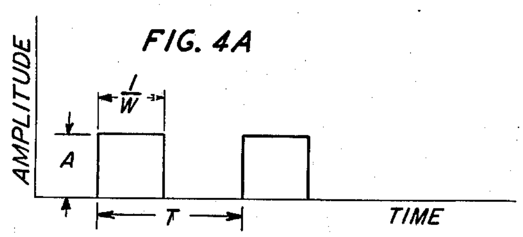

Referring now to FIG. 4A, there is illustrated a train of repetitive pulses of the type employed in a typical radar signal, in which the pulses are of uniform amplitude A and of uniform duration $1/W$, where the pulse repetition frequency is equal to the reciprocal of the period, T, of the pulse train. The frequency spectrum of these pulses is shown in FIG. 4B, where the vertical lines represent in somewhat idealized and simplified form the frequency components of the signal, and the spacing between adjacent lines is uniformly equal to the pulse repetition frequency or the reciprocal of the pulse train period, $1/T$. The width of the frequency spectrum W is equal to $N/T$, where N represents the number of lines or components in the spectrum. In the case of a typical chirp radar signal, the spectrum width W is ordinarily made large enough to achieve high range resolution. But it is understood that the typical transmitted chirp radar signal differs in character from the signal shown in FIG. 4A, in that it consists of a single pulse of a duration of, for example, T, and is characterized by the continuous spectrum shown in FIG. 4H rather than the discrete or line spectrum shown in FIG. 4B.

Figure 4F:
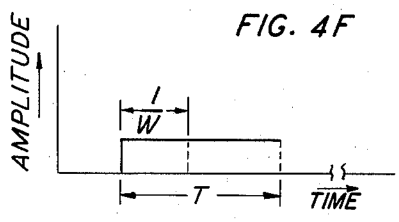

In a chirp system, the width of each pulse is increased from $1/W$ to T, that is, the duration of each pulse is increased to fill an entire period, as shown in FIG. 4F. It is observed in FIG. 4F that the increase in pulse duration is accompanied by a decrease in uniform amplitude. By increasing the pulse length by a factor $n$, the pulse peak power can be reduced by a factor $n$ without changing the pulse energy, thereby permitting efficient use of existing radar transmission equipment. The pulse amplitude is thereby reduced from $$A \text{ to } \frac{A}{\sqrt{n}}$$

Figure 4G:
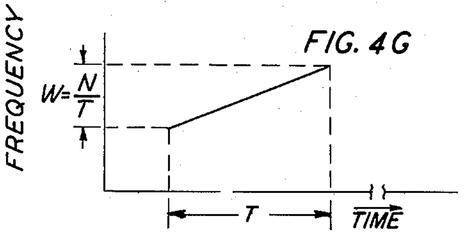

This increase in pulse duration is accomplished in a conventional chirp system by changing the relative phases of the frequency components of the original pulses, for example, by passing each pulse to be transmitted through a so-called dispersive network that has a linear frequency versus delay time characteristic of the kind shown in FIG. 4G. It is to be noted at this point that the spectrum of the long duration pulse obtained in a chirp system has the same width as an original short duration pulse, since the changing of relative phases of the frequency components to increase pulse duration does not otherwise affect the original pulse spectrum. Hence the continuous spectrum shown in FIG. 4H may represent the spectrum of either the long duration chirp pulse illustrated in FIG. 4F or one of the short duration pulses in FIG. 4A.

Figure 4M:
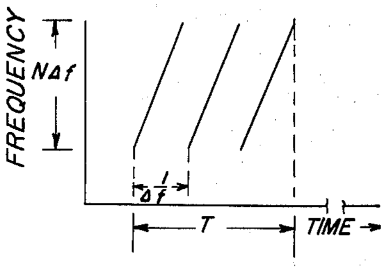
Figure 4H:
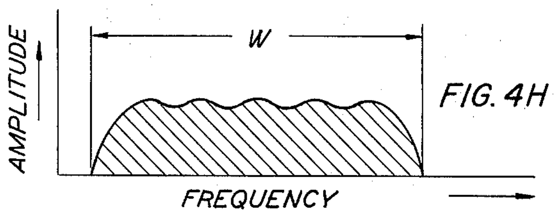

When a chirp radar signal with the spectrum shown in FIG. 4H is reflected from an object moving relative to the radar system, the well-known Doppler effect causes each component in the spectrum to be slightly shifted in frequency by the amount $f_D$ which is proportional to the radial velocity V of the object, where $$f_D = \frac{2V}{c} \cdot f_c \quad (3)$$

Therefore, in the case of a radar signal reflected from two objects having different radial velocities $V_1$ and $V_2$, the difference between the corresponding Doppler frequency shifts $f_{D1}$ and $f_{D2}$ of the two reflected signals is given by $$f_{D1} - f_{D2} = 2\frac{(V_1 - V_2)}{c} \cdot f_c \quad (4)$$

It is apparent from Equation 4 that if the difference between the velocities $V_1$ and $V_2$ become sufficiently small, the difference between the Doppler shifts $f_{D1}$ and $f_{D2}$ becomes small compared to the spectrum bandwidth W, making it impossible to discriminate between the spectra of the signals reflected from the two objects. This situation is illustrated in FIG. 4C, where the envelope of the original spectrum is shown by a solid line, and the envelopes of the two reflected spectra are shown by broken lines. It is observed in FIG. 4C that the two reflected spectra overlap in frequency due to the relatively small shift in frequency caused by the Doppler effect as compared with the relatively wide bandwidth of each of the reflected spectra.

Figure 4I:
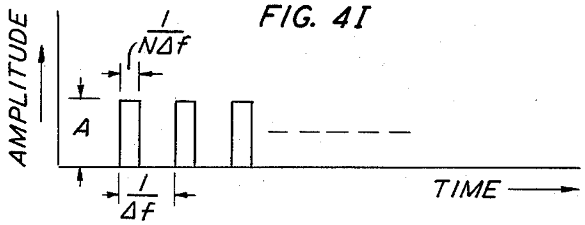
Figure 4J:
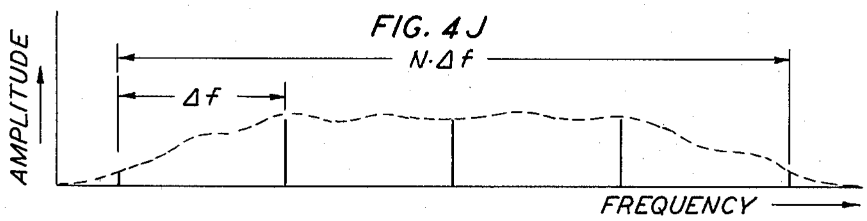

In the present invention there is generated a series of pulses at a pulse repetition frequency, $\Delta f$, as shown in FIG. 4I, which is large in comparison with the reciprocal of the duration of the signal to be transmitted. Thus if the duration of the signal to be transmitted is the same as in the previous example shown in FIG. 4F, then $$\Delta f \gg \frac{1}{T}$$

where $\Delta f$ may be on the order of ten times larger than $1/T$. For convenience of description, the width of the spectrum of the pulses in FIG. 4I is made equal to $(\Delta f \cdot T)W$, where W is the width of the spectrum of the pulses in FIG. 4A, so that as shown in FIG. 4J the spectrum of the pulses in FIG. 4I has a width equal to $$(\Delta f \cdot T)W = \Delta f \cdot T \cdot \frac{N}{T} = N \cdot \Delta f$$

and the same number of lines, N, as the spectrum of the pulses in FIG. 4A. As in the case of a conventional chirp radar signal, the signal transmitted by this invention during a given time interval T comprises a finite portion of the pulse train shown in FIG. 4I; for example, the signal transmitted by this invention during a time interval $$T = \frac{k}{\Delta f}$$

Figure 4K:
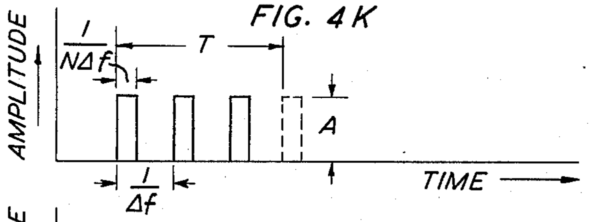

$k=1, 2, \ldots$, comprises an integral number of periods of the original pulse train, as shown in FIG. 4K. It is of particular significance to point out that by appropriate choice of the pulse repetition frequency $\Delta f$ and the transmitted signal duration T the spectrum of the finite number of pulses in FIG. 4K is not continuous but comprises a discrete number of so-called individual subspectra, as shown in FIG. 4D, which reflect the signal design, $$\Delta f \gg \frac{1}{T}$$

in that the spacing between adjacent subspectra, $\Delta f$, is large in comparison with the width of the individual subspectra, $1/T$, where the width of each of the individual subspectra is measured between points on either side of and 3 decibels below the peak of each subspectrum.

The Doppler resolution attainable with a radar signal having the spectrum of FIG. 4D is illustrated in FIG. 4E. The two subspectra outlined in broken lines to the right of each transmitted subspectra represent the effect of reflection from two moving objects of different radial velocities, $V_1$ and $V_2$, resulting in frequency shifts $f_{D1}$ and $f_{D2}$, respectively. Since $f_{D1}$ and $f_{D2}$ in FIG. 4E are equal to $f_{D1}$ and $f_{D2}$ in FIG. 4C, it is readily apparent that the Doppler resolution of a radar signal having the spectrum shown in FIG. 4D is high in comparison with a signal having the spectrum illustrated in FIG. 4B. The exact Doppler resolution of a signal having the kind of spectrum shown in FIG. 4D is given by Equation 2, where the bandwith W in Equation 2 is replaced by $1/T$, the widths of the individual subspectra. Thus, for a pulse duration of $T=400$ microseconds, and a carrier frequency of $f_c=1000$ megacycles per second, the Doppler resolution of a transmitted radar signal whose frequency spectrum comprises the subspectra of FIG. 4D is approximately 1200 feet per second, that is, moving objects whose radial velocities differ by as little as 1200 feet per second are resolved by a radar system employing such a signal.

Figure 4L:
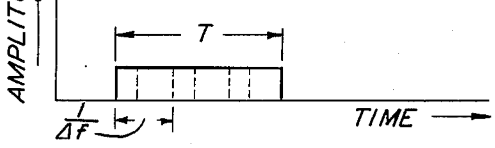

Prior to transmission of the pulses shown in FIG. 4K, the present invention increases the duration of each pulse by a factor N from $$\frac{1}{N\Delta f} \text{ to } \frac{1}{\Delta f}$$

as shown in FIG. 4L, such that a continuous signal of uniform amplitude and of duration T is obtained. As in a conventional chirp system, this increase in pulse duration is accomplished in the present invention by changing the relative phases of the frequency components of the pulses in FIG. 4K, so that the pulses in FIGS. 4K and 4L both have the same spectrum shown in FIG. 4D.

However, whereas in a conventional chirp system the pulse to be transmitted has a frequency versus time characteristic such that the pulse appears to have been frequency swept a single time over a given frequency range during its time interval T, as shown in FIG. 4G, in the present invention the pulse to be transmitted has a frequency versus time characteristic such that the pulse appears to have been successively frequency swept a number of times over the same frequency range during the interval T, as shown in FIG. 4M. Thus the signal to be transmitted in accordance with the present invention may be considered to consist of a plurality of successive, identical chirp signals. Having obtained high Doppler resolution by constructing and transmitting a uniform amplitude radar signal whose spectrum comprises relatively narrow subspectra widely dispersed in frequency, the present invention also obtains high range resolution by reducing the spacing between adjacent subspectra of the reflected signal to construct a single, relatively wide spectrum of the type illustrated in FIG. 4B. In order to construct a single, relatively wide spectrum which yields high range resolution, it is first necessary to select those subspectra which are reflected from each moving object having a velocity that lies within a predetermined narrow range of radial velocities, and it is from these select subspectra that this invention obtains a single spectrum composed of closely spaced frequency components. This single spectrum is wide enough to yield the desired range resolution, and the wide spectrum signal is then processed to obtain for each target return a short pulse of duration 1/W.

*Apparatus*

A general application of the principles of this invention in a typical radar system is illustrated in FIG. 1. Synthetic subspectra generator 10, whose structure is shown in detail in FIGS. 2B and 3B, produces a pulse-type signal whose spectrum comprises individual subspectra of the character shown in FIG. 4D. This signal is applied to radar transmitter 11, which increases the duration of the individual pulses and provides a suitable carrier frequency. The duration of the individual pulses may be increased in transmitter 11 by any one of a number of time dispersion schemes; for example, the duration may be increased by linear time dispersion of the type employed in chirp radar systems, or by any desired nonlinear time dispersion. The output signal of transmitter 11 is passed through conventional transmit-receive switch 12 to antenna 13, which radiates the signal as a beam of energy toward the objects to be detected.

After reflection from the objects back to antenna 13, the beam of energy is converted into an electrical signal which is passed through transmit-receive switch 12 to intermediate-frequency receiver 14. In receiver 14, the reflected signal is amplified, and the carrier frequency of the reflected signal is replaced by a suitable intermediate frequency. From receiver 14, the intermediate frequency signal is applied in parallel to *n* so-called Doppler channels *a* through *n*. The number *n* of Doppler channels employed depends upon the upper and lower limits of the radial velocities of the objects to be detected, each Doppler channel corresponding to a narrow range of velocities within these limits. Each Doppler channel includes a Doppler discriminator, spectrum compressor, signal processor, detector, and video indicator, all connected in tandem, where in Doppler channel *a*, for example, these components are labeled **15*a*, 16*a*, 17*a*, 18*a*, and 19*a***, respectively.

Figures 2A, 5:
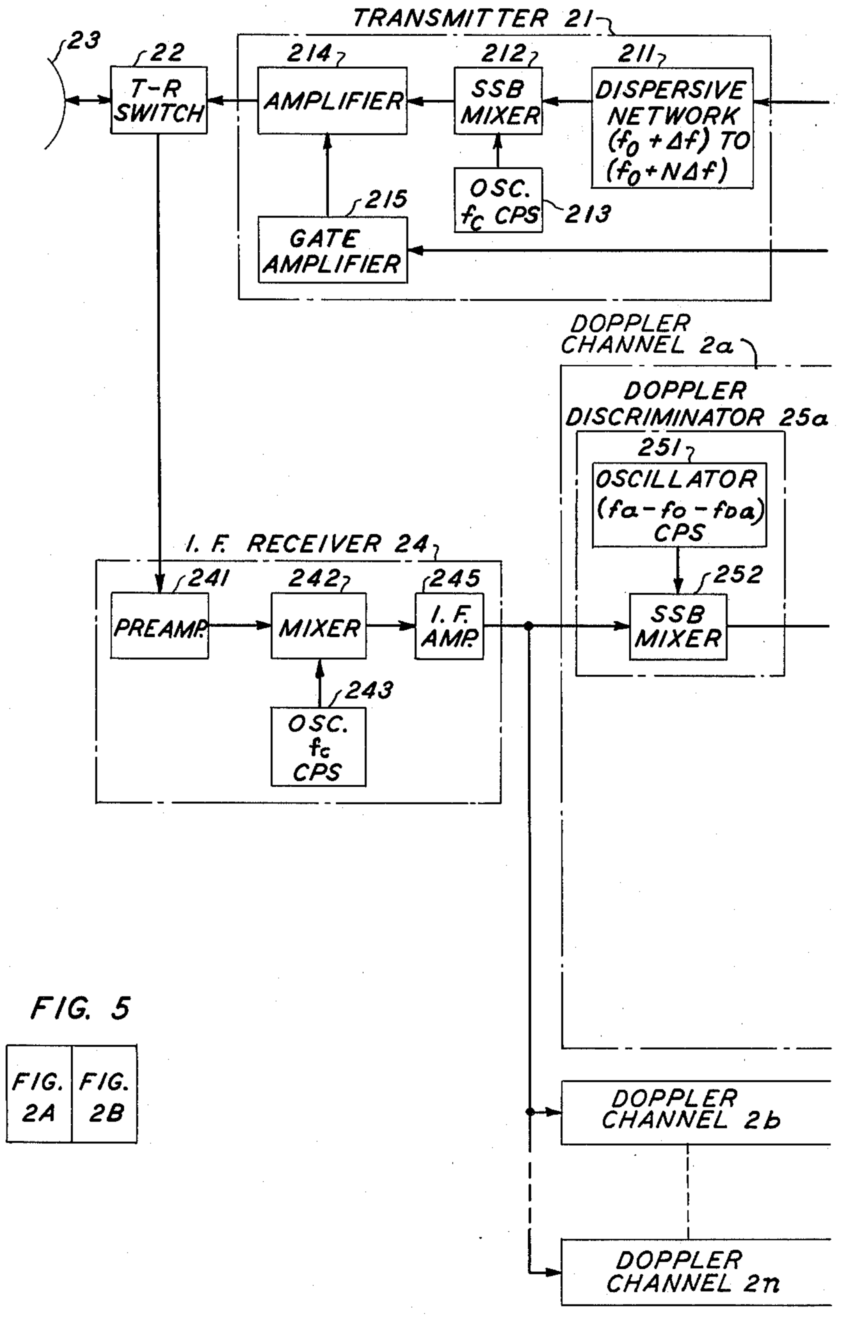
FIGS. 2A and 2B show in detail an embodiment of the principles of this invention in a complete radar system.
FIG. 5 is a diagram illustrating the structural relationship between FIGS. 2A and 2B.
Figure 2B:
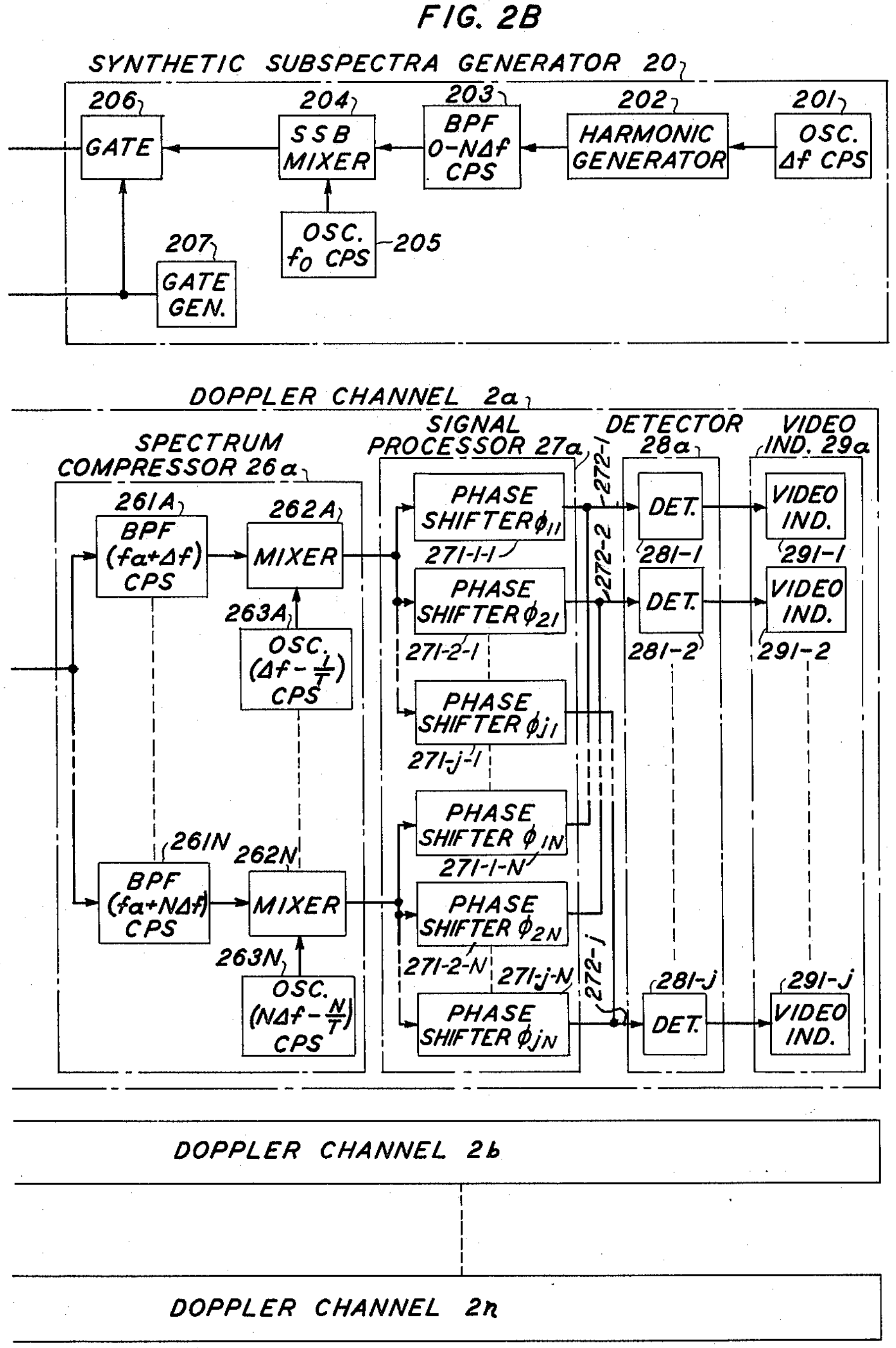
Figures 3A, 6:
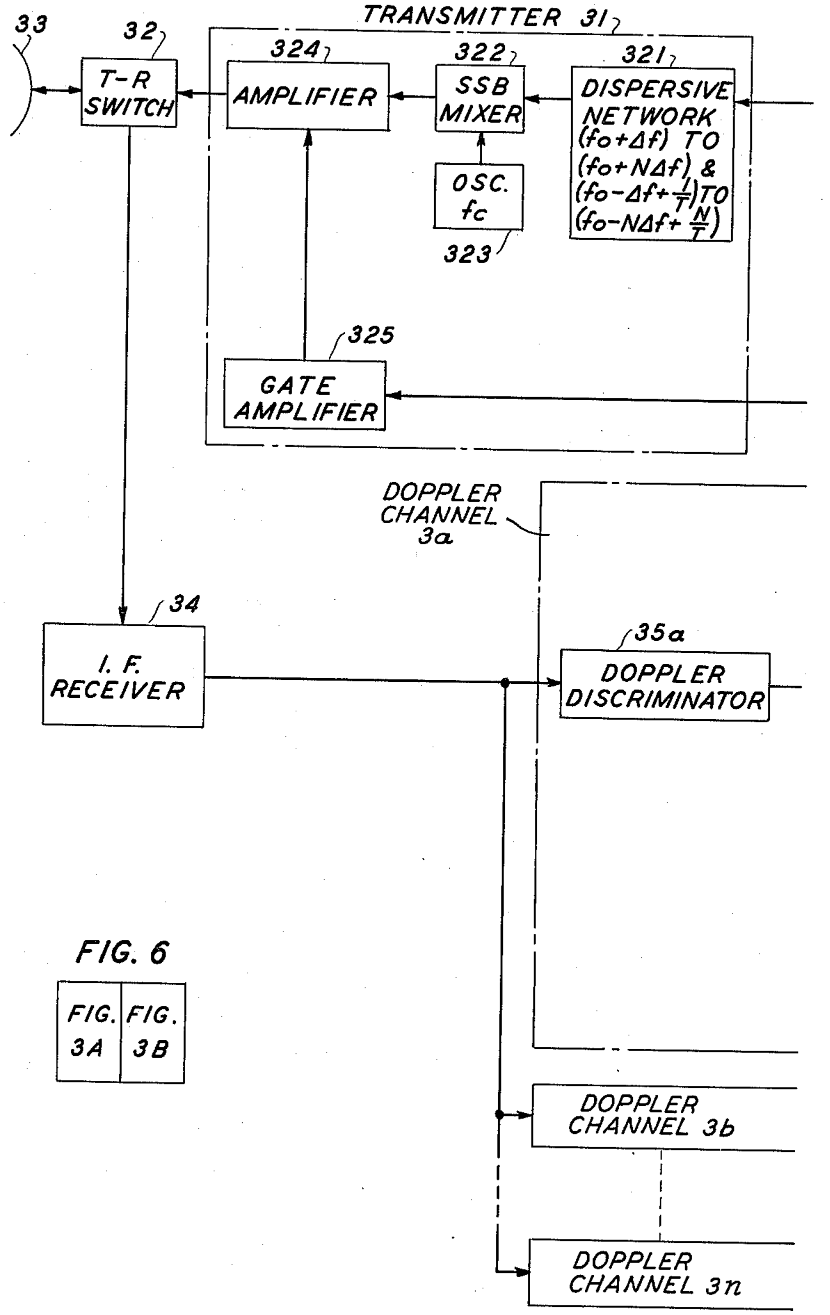
FIGS. 3A and 3B represent a preferred detailed embodiment of the principles of this invention in a complete radar system.
FIG. 6 is a diagram illustrating the structural relationship between FIGS. 3A and 3B.

Each Doppler discriminator, which is shown in detail in FIGS. 2A and 3A, is constructed to select from the subspectra of the incoming signal from receiver 14 only those subspectra which are reflected from objects whose velocities lie within a predetermined narrow range of radical velocities, the selection being based upon the Doppler frequency shift associated with a particular velocity within the predetermined narrow range of velocities. The frequency spacing between the subspectra selected by each discriminator is compressed in a spectrum compressor which is illustrated in detail in FIGS. 2B and 3B, to obtain a number of frequency components spaced close enough to define a single spectrum of sufficient width to yield high range resolution. From each compressor, the frequency components of the single, relatively wide spectrum are passed to a signal processor, which produces a short duration signal having high range resolution. The high range resolution signal is then applied to a suitable detector, which converts the processed signal into a video signal appropriate for visual display on a conventional video indicator.

Turning now to FIGS. 2A and 2B, these drawings illustrate a particular application of the principles of the present invention in a specific radar system. In synthetic subspectra generator 20 of FIG. 2B, oscillator 201 generates a sine wave signal at a single pulse repetition frequency, $\Delta f$, where $\Delta f$, which is expressed in cycles per second, is to be the spacing between adjacent subspectra. The exact value of $\Delta f$ is determined by the largest anticipated variation in radial velocities, as given by Equation 4. Thus if $f_{D1}$ represents the upper limit of the anticipated Doppler shift and $f_{D2}$, the lower limit, then $\Delta f > f_{D1} - f_{D2}$. For example, a variation in velocities between 10,000 and 30,000 feet per second may be accommodated by selecting a $\Delta f$ of approximately $50 \times 10^3$ cycles per second, for a carrier frequency $f_c$ of about $1 \times 10^9$ cycles per second. The single frequency signal from oscillator 201 is applied to harmonic generator 202, which operates in well-known fashion to generate harmonics occurring at frequencies $\Delta f$, $2\Delta f$, $3\Delta f$, . . . , and those harmonics from generator 202 that are higher in frequency than an appropriate predetermined frequency $N\Delta f$ are eliminated by bandpass filter 203, which is connected to the output terminal of generator 202 and has a cutoff frequency of $N\Delta f$.

Each of the N harmonics of the fundamental frequency $\Delta f$ appearing at the output terminal of filter 203 is translated on the frequency scale by an amount equal to $f_0$, where $f_0$ is a suitable intermediate frequency that may be on the order of $30 \times 10^6$ cycles per second. This translation in frequency is effected by a conventional single sideband mixer 204 supplied with a signal of frequency $f_0$ from oscillator 205. The translated harmonics, denoted $f_0+\Delta f$, $f_0+2\Delta f$, . . . ,$f_0+N\Delta f$, are applied to the input terminal of gate 206, and a control signal of duration T seconds from gate generator 207 is applied to the control terminal of gate 206. In this fashion, the signal appearing at the output terminal of gate 206 comprises a finite series of narrow repetitive pulses of the type shown in FIG. 4K, and the frequency spectrum of this signal is composed of N subspectra of the character illustrated in FIG. 4D.

From generator 20, the repetitive pulses produced at the output terminal of gate 206 are delivered to dispersive network 211 of transmitter 21 shown in FIG. 2A. Dispersive network 211 increases the duration of the pulses from generator 20, and by changing the relative phases of the frequency components of the pulses forms a continuous signal of duration T. The continuous signal is then utilized in a conventional single sideband mixer 212 to modulate the carrier frequency $f_c$ supplied by oscillator 213. The carrier frequency $f_c$ is an appropriate radio frequency of approximately $1 \times 10^9$ cycles per second, and the output signal of mixer 212 is gated through amplifier 214 with a suitable duty factor controlled in usual fashion by gate generator 207 and gate amplifier 215. From transmitter 21, the gated signal is passed through transmit-receive switch 22 and radiated as a beam of energy by antenna 23.

Part of the radiated energy is reflected by objects in its path, and some of this reflected energy is detected by antenna 23 and converted into an electrical signal that is directed by transmit-receive switch 22 to intermediate-frequency receiver 24. In receiver 24, the amplitude of the incoming signal is increased by preamplifier 241, and the frequency components of the increased amplitude signal are shifted in mixer 242 from the radio frequency carrier $f_c$ to the previously selected intermediate-frequency $f_0$, the difference frequency $f_c$ being supplied by oscillator 243. The output signal of mixer 242 is amplified by intermediate-frequency amplifier 245 and then delivered in parallel to Doppler channels $2a$ through $2n$.

Before proceeding to a detailed description of the operation of the Doppler channels, it will be helpful at this point to examine the structure of the frequency spectrum of the signal delivered in parallel to the Doppler channels. For convenience, it will be assumed that the signal transmitted by antenna 23 is reflected from two objects moving at different radial velocities $V_a$ and $V_x$ relative to the radar system, and located at different ranges $R_a$ and $R_x$ relative to the radar system, but it is to be understood that the present invention is capable of determining the ranges and velocities of any number of objects, subject, of course, to the resolution limits described above. From these two objects there will be reflected two sets of subspectra, the subspectra of one set being shifted in frequency from the corresponding transmitted subspectra by an amount $f_{Da}$ proportional to $V_a$, and the subspectra of the other set being shifted in frequency by a different amount $f_{Dx}$ proportional to $V_{Dx}$, the relationship of these two sets of subspectra on the frequency scale being similar to the simplified illustration in FIG. 4E. As a result of these Doppler shifts, the intermediate-frequency subspectra reflected from the first object are centered on frequencies $(f_0+\Delta f+f_{Da})$, $(f_0+2\Delta f+f_{Da})$, . . . , $(f_0+N\Delta f+f_{Da})$, while the subspectra reflected from the second object are centered on frequencies $$(f_0+\Delta f+f_{Dx}),\ (f_0+2\Delta f+f_{Dx}),\ \ldots,(f_0+N\Delta f+f_{Dx})$$

Referring back to Droppler channel $2a$ of FIG. 2A, the two sets of subspectra which constitute the incoming signal from receiver 24 are applied to mixer 252, together with a signal of frequency $(f_a-f_0-f_{Da})$ from oscillator 251, where $f_a$ is determined by the construction characteristics of suitable bandpass filters 261A through 261N in FIG. 2B following mixer 252. Because of the distinct separation in frequency between subspectra reflected from objects of sufficiently different velocities, the output signal of mixer 252 comprises two distinct sets of subspectra, one set being centered on the frequencies $(f_a+\Delta f)$, $(f_a+2\Delta f)$, . . . , $(f_a+N\Delta f)$, and the other set being centered on the frequencies $(f_a+\Delta f+f_{Dx}-f_{Da})$, $(f_a+2\Delta f+f_{Dx}-f_{Da})$, . . . , $(f_a+N\Delta f+f_{Dx}-f_{Da})$. It is therefore readily apparent that corresponding subspectra in the two sets differ in frequency by a constant amount $(f_{Dx}-f_{Da})$. To eliminate the second, unwanted set of subspectra, bandpass filters 261A through 261N are constructed with relatively narrow pass bands about center frequencies $(f_a+\Delta f)$ through $(f_a+N\Delta f)$, respectively. Thus the signals passed by filters 261A through 261N represent only the N subspectra reflected from the first object, thereby achieving the desired Doppler resolution within Doppler channel $2a$. Similarly, the remaining Doppler channels select from the incoming signal from receiver 24 those subspectra that are reflected from objects whose radial velocities lie within a narrow band of velocities around predetermined velocities $V_b$, $V_c$, . . . , $V_n$, which produce corresponding Doppler shifts $f_{Db}$, $f_{Dc}$, . . . , $f_{Dn}$.

In order to obtain the single, relatively wide spectrum necessary for high range resolution, the signals from filters 261A through 261N in Doppler channel $a$ mixers 262A through 262N, respectively. These mixers are supplied with signals of frequencies $$\left(\Delta f-\frac{1}{T}\right),\ \left(2\Delta f-\frac{2}{T}\right),\ \ldots,\ \left(N\Delta f-\frac{N}{T}\right)$$

and oscillator 302 to mixer 303, so that the frequency of the output signal of mixer 303 is the difference between $\Delta f$ from oscillator 301 and $(1/T)$ from oscillator 302, where $\Delta f$ and $(1/T)$ may have the same values given above in the description of FIG. 2B. The output signal $$\left(\Delta f-\frac{1}{T}\right)$$

of mixer 303 is applied to harmonic generator 305 followed by bandpass filter 307 to obtain a group of N harmonics, $$\left(\Delta f-\frac{1}{T}\right), \left(2\Delta f-\frac{2}{T}\right), \ldots, \left(N\Delta f-\frac{N}{T}\right)$$

Each of the N harmonics passed by filter 307 is translated in frequency by mixer 310 by the same intermediate frequency $f_0$ supplied by oscillator 308 to mixer 309. The output signal of mixer 310 is combined with the output signal of mixer 309 producing an output signal whose frequency spectrum comprises the upper and lower sets of subspectra referred to above.

Referring now to FIG. 3A, the output signal of gate 312 of generator 30 is passed to dispersive network 321 of transmitter 31. Dispersive network 321 converts the output signal of gate 312, which consists of two pulse trains of carrier frequency, the first one with pulse interval $1/\Delta f$, the second one with pulse interval $$\frac{1}{\Delta f}-\frac{1}{T}$$

into a signal of duration T. The remaining elements of transmitter 31, as well as transmit-receive switch 32, antenna 33, and intermediate-frequency receiver 34, are identical in function with similarly labeled components in FIG. 2A and operate to transmit and receive a radar signal characterized by a frequency spectrum containing the two sets of subspectra described above. It is understood, however, that the elements of FIG. 3A are modified where necessary to accommodate the frequencies contained in both sets of subspectra.

The output terminal of receiver 34 is connected to the input terminals of parallel Doppler channels **3*a* through 3*n* so that the two sets of reflected subspectra are applied simultaneously to each Doppler channel. In each Doppler channel the incoming sets of subspectra are first applied to a Doppler discriminator, which in conjunction with the following spectrum compressor operates in the same fashion as the corresponding elements of FIG. 2A to select only pairs of upper and lower sets of subspectra reflected from moving objects whose radial velocities lie within the same predetermined velocity interval. From each discriminator, each of the pairs of selected upper and lower sets of subspectra are applied to a spectrum compressor to obtain a corresponding single, relatively wide frequency spectrum. Thus, as shown in detail in FIG. 3B, the subspectra from Doppler discriminator 35*a* of Doppler channel 3*a* are applied to N pairs of bandpass filters 361–1–1 and 361–1–2 through 361–N–1 and 361–N–2 in spectrum compressor 36*a***, and the output signals of these N pairs of filters respectively represent two separate sets of subspectra, an upper set $(f_a+\Delta f)$ through $(f_a+N\Delta f)$, and a lower set $$\left(f_a-\Delta f+\frac{1}{T}\right) \text{ through } \left(f_a-N\Delta f+\frac{N}{T}\right)$$

It is observed at this point that the two sets of subspectra reflected from each moving object are both subject to the same periodic phase variation due to the changing range of the object. However, by suitably combining the output signals of each pair of filters in each spectrum compressor, this periodic phase variation may be eliminated. This is accomplished in spectrum compressor **36*a* by applying the output signals of each pair of filters 361–1–1 and 361–1–2 through 361–N–1 and 361–N–2 to a conventional single sideband mixer, 362–1 through 362–N**, respectively. The output signals of the mixers, denoted $$\left(2f_a+\frac{1}{T}\right) \text{ through } \left(2f_a+\frac{N}{T}\right)$$

therefore constitute the components of a single frequency spectrum from which all phase variation due to changing range has been removed. By removing the phase variation in this fashion, no further compensation for this phase variation is required, and the system is equally sensitive to moving objects at all ranges.

The N output signals of the spectrum compressor in each Doppler channel are delivered to a signal processor of the type shown in detail in Doppler channel **3*a*. Signal processor 37*a* in channel 3*a* comprises N phase shifters 371A through 371N, which operate to shift the phases of the N output signals of compressor 36*a* to compensate for the time dispersion introduced into the transmitted signal by dispersive network 321**.

By combining the output signals of the phase shifters in each processor, there is obtained at the output terminal of the processor in each Doppler channel a pulse-type signal of relatively short duration which yields high range resolution at all ranges for objects moving at a radial velocity lying within the predetermined velocity interval established for each channel. These pulse-type signals are displayed visually by a covnentional detector and video indicator, as shown by detector **38*a* and video indicator 39*a* in Doppler channel 3*a***.

In the foregoing explanation of the principles of this invention, the subspectra of the transmitted signal of this invention have been shown and described in terms of a uniform spacing in frequency, $\Delta f$, between adjacent subspectra. However, it is believed to be evident from the theoretical considerations presented above that this uniform spacing in itself does not have special significance in producing the advantages of this invention, since it is the relative spacing between subspectra as compared with anticipated object velocities and relative widths of individual subspectra as compared with spacing between subspectra that provide the resolution capabilities of the present radar system. It will therefore be evident to those skilled in the radar art that the subspectra generators in FIGS. 2B and 3B may be accordingly modified to generate nonuniformly spaced subspectra, and the spectrum processors may be correspondingly modified to reconstruct a single, relatively wide spectrum from the nonuniformly spaced subspectra.

Although this invention has been described in terms of specific radar systems, it is to be understood that the above-described embodiments are merely illustrative of the numerous applications which may be devised for this invention by those skilled in the art without departing from the spirit and scope of the invention. More generally, it is to be understood that the principles of this invention are not limited to applications in radar systems but may be applied by those skilled in the art to a wide variety of systems for transmitting and receiving signals.

What is claimed is:

1. A system for transmitting and receiving signals which comprises means for generating a first set of signals each having a relatively long duration T and each having a frequency spectrum that comprises a plurality of relatively narrow frequency subspectra in which the spacing in frequency $\Delta f$ between adjacent subspectra is large in comparison with the width $1/T$ of each of said subspectra, means for transmitting said first set of signals, means for receiving said transmitted first set of signals, and means responsive to said received first set of signals for compressing the spacing in frequency between adjacent subspectra of each of said first set of signals from oscillators 263A through 263N, respectively, thereby producing at the output terminals of the mixers a set of frequency components $$\left(f_a+\frac{1}{T}\right), \left(f_a+\frac{2}{T}\right), \ldots, \left(f_a+\frac{N}{T}\right)$$

This set of components constitutes a single spectrum of the type shown in FIG. 4B, where the spacing between adjacent components is1/T and the width of the spectrum, which is equal to N/T, the sum of the spacings between individual components, is sufficiently wide to yield high range resolution.

The N ouput signals of the spectrum compressor in each Doppler channel constitute the components of a single spectrum that is substantially wider than any of the individual subspectra from which it is derived. However, in order to combine these N components to form a short duration signal having high range resolution, it is first necessary to establish the proper phase relation between these N components. Establishment of the proper phase relations, which is performed in the signal processor element of each Doppler channel, depends chiefly upon two factors: the particular time dispersion or phase change introduced into the transmitted signal by dispersive network 211; and the periodic variations in phase of the reflected subspectra arising from the changing range of a moving object. Since that portion of the phase relations which must be established to compensate for time dispersion is well known, only that portion of the phase relations required to compensate for changing range will be examined in detail in the following discussion.

It is well known that a signal received after reflection from an object is shifted in phase by an amount determined by the total distance traveled by the signal and the frequency of the signal, and in the case of a moving object, this phase shift varies periodically as the range of the object changes. Therefore, in the radar signal of this invention, each of the subspectra reflected from a moving object is shifted in phase by a different amount, and each of these phase shifts varies periodically. If this periodic variation in phase is not taken into account, and only the phase shift required to compensate for the time dispersion introduced at the transmitter is provided in each signal processor, the amplitude of the processor output signal, which is derived by combining the N phase shifted components, will also vary periodically with range, and the system will be selective in range; that is, the system will be more sensitive to objects at certain ranges and less sensitive to objects at other ranges.

In order to overcome this inherent range selectivity, the phase shifts established in each signal processor must also take into account the periodic variation in phase of the subspectra reflected from moving objects. This is accomplished by selecting those range intervals within which it is desired to detect moving objects with high range sensitivity. For each selected range interval, the corresponding phase shift for each subspectrum is determined from well-known relations between phase shift, frequency and distance, and in each processor each of the corresponding N incoming components is simultaneously shifted in phase by amounts associated with the various selected range intervals, as well as by an amount necessary to offset the time dispersion introduced into the transmitted signal by dispersive network 211. The phase shift applicable to a particular subspectrum is also applicable to the corresponding component appearing at the output terminal of a compressor, because this phase shift can also be made to appear in the corresponding component by suitable design of the elements of the discriminators and compressors in which each of the N components is derived from the corresponding one of the N subspectra.

In each signal processor a separate group of N phase shifted components is obtained for each selected range interval; for example, if there are $j$ selected range intervals, $j$ groups will be obtained, each group containing N phase shifted components. As a result of the phase shifts, the sum of each group of N phase shifted components defines a sharply peaked signal for all objects moving within each selected range interval at a radial velocity lying within the selected velocity interval of the particular Doppler channel, and the duration of each sharply peaked signal is short enough to yield high range resolution.

Referring now to signal processor 27*a* of Doppler channel 2*a* of FIG. 2B, there are N sets of phase shifters, and each set of phase shifters comprises $j$ individual phase shifters, where $j$=1.2, . . . is the number of selected range intervals within which it is desired to detect moving objects. In signal processor 27*a*, the first set of $j$ phase shifters 271–1–1 through 271–$j$–1 shifts the phase of incoming component $$\left(f_a+\frac{1}{T}\right)$$

by predetermined amounts $\Phi_{11}, \Phi_{21}, \ldots \Phi_{j1}$, and the Nth set of $j$ phase shifters 271–1–N through 271–$j$–N shifts the phase of incoming component $$\left(f_a+\frac{N}{T}\right)$$

by predetermined amounts $\Phi_{1N}, \Phi_{2N} \ldots \Phi_{jN}$. Each phase shifted component apearing at the output terminals of the phase shifters is combined with $N-1$ other phase shifted components corresponding to the same selected range interval; for example, if the phase shifted component appearing at the output terminal of phase shifter 271–2–1 is denoted $$\left[\left(f_a+\frac{1}{T}\right), \Phi_{21}\right]$$

it is combined on lead 272–2 with $N-1$ other phase shifted signals denoted $$\left[f_a+\frac{2}{T}\right), \Phi_{22}\right], \ldots, \left[\left(f_a+\frac{N}{T}\right), \Phi_{2N}\right]$$

The $j$ frequency spectra obtained in this fashion on leads 272–1 through 272–$j$ represent $j$ pulse-type signals of relatively short duration, and each of these $j$ pulse-type signals has high range resolution over a selected range interval.

Following signal processor 27*a*, detector 28*a* comprises $j$ individual detectors 281–1 through 281–$j$, one for each of the $j$ short duration pulses produced by processor 27*a*, and video indicator 29*a* comprises $j$ video indicators for displaying visually each of the $j$ signals. Since each Doppler channel is responsive to subspectra reflected from moving objects of approximately the same velocity, the visual display provided by each of the video indicators shows only those objects having approximately the same velocity and lying within the same selected range interval.

Figure 3B:
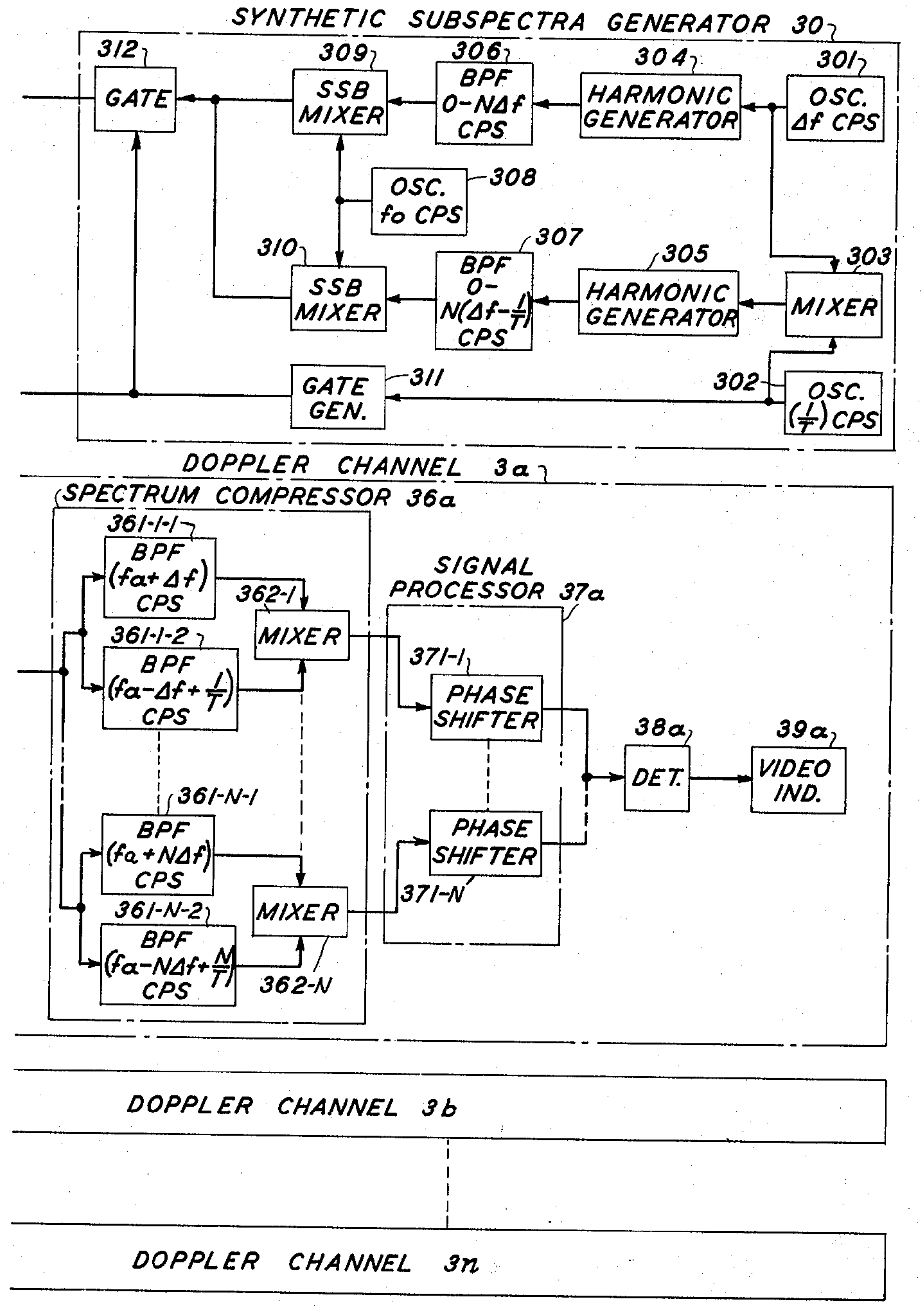

A different approach to the problem presented by periodic phase variation in the reflected subspectra is illustrated in FIGS. 3A and 3B, in which each Doppler channel 3*a* through 3*n* produces single, short duration signals and yields high range resolution at all ranges. In synthetic subspectra generator 30 shown in FIG. 3B, two sets of subspectra are generated, a so-called "upper" set centered on frequencies $f_0+\Delta f$, $f_0+2\Delta f$, . . . , $f_0+N\Delta f$, and a so-called "lower" set centered on frequencies $$\left[f_a+\left(\Delta f-\frac{1}{T}\right)\right], \left[f_0+\left(2\Delta f-\frac{2}{T}\right)\right], \ldots, \left[f_0\left(N\Delta f-\frac{N}{T}\right)\right]$$

The upper set is generated by oscillator 301, harmonic generator 304, bandpass filter 306, mixer 309, and gate 312 in a fashion identical with that of the corresponding elements of FIG. 2B. The lower set of subspectra is generated by applying the output signals of oscillator 301 to develop a second set of signals each having a single, relatively wide frequency spectrum.

2. A signal transmission system that comprises means for transmitting a first series of signals each of relatively long duration T, each of said first series of signals being characterized by a frequency spectrum that comprises a plurality N of relatively narrow, widely separated frequency subspectra in which the separation $\Delta f$ between adjacent subspectra is large in comparison with the width $1/T$ of said relatively narrow subspectra, means for receiving said first series of signals, and means supplied with said first series of signals for compressing the spacing in frequency between adjacent subspectra of said first series of signals to form a corresponding second series of signals each having a single, relatively wide frequency spectrum of width $N/T$.

3. A signal transmission system that comprises means for transmitting a signal of relatively long duration T and characterized by a spectrum comprising a plurality N of relatively narrow frequency subspectra of width $1/T$ and widely separated in frequency from one another by an amount $\Delta f$ by choosing $\Delta f$ to be substantially larger than $1/T$, and after receiving said subspectra, means for reducing the spacing in frequency between adjacent subspectra to form a single, relatively wide frequency spectrum of width $N/T$.

4. A radar system comprising means for transmitting to distant objects a first signal of relatively long duration T and having a frequency spectrum that comprises a predetermined plurality of relatively narrow subspectra having a width $1/T$ and a spacing $\Delta f$ between subspectra, where $\Delta f$ and T are chosen so that $\Delta f$ is substantially larger than $1/T$, and after reflection of said first signal from said objects, means for constructing from the subspectra of said reflected first signal a second signal of relatively short duration and having a single, relatively wide frequency spectrum.

5. A radar system that comprises means for transmitting to distant objects a signal of relatively long duration T characterized by a spectrum comprising a plurality of relatively narrow frequency subspectra in which each subspectrum has a width $1/T$ and in which the spacing between subspectra is equal to $\Delta f$, where $\Delta f$ and T are selected so that $\Delta f$ is substantially larger than $1/T$, and after reflection of said subspectra from said objects, means for compressing the frequency spacing between said reflected subspectra to form a single, relatively wide frequency spectrum.

6. A radar system that comprises means for transmitting to distant objects a signal of relatively long duration T characterized by a spectrum comprising two sets of frequency subspectra, wherein each set of subspectra includes a plurality of relatively narrow frequency subspectra in which each subspectrum had a width $1/T$ which is small in comparison with the spacing between adjacent subspectra, and each subspectrum in one set differs in frequency from a corresponding subspectrum in the other set by a predetermined amount, and after reflection from said objects, means for constructing from the two sets of subspectra reflected from each object a single set of subspectra in which the spacing between adjacent subspectra is $1/T$ to form a single, relatively wide frequency spectrum.

7. A radar system comprising means for transmitting to distant objects a signal of relatively long duration T and characterized by a spectrum comprising two groups of frequency subspectra, each subspectrum in each group being narrowly centered by an amount $1/T$ about a selected frequency and widely spaced in frequency from adjacent subspectra in the same group by choosing the spacing between adjacent subspectra to be substantially larger than the width $1/T$ of individual subspectra, and after reflection from said objects, means for combining said two groups of reflected subspectra to obtain a signal of relatively short duration characterized by a single, relatively wide frequency spectrum.

8. A system for determining with high resolution the velocity and the range of distant objects which comprises a generator for synthesizing a signal of relatively long duration T having a spectrum that comprises a plurality N of relatively narrow frequency subspectra each of which is widely separated in frequency by an amount $\Delta f$ from adjacent subspectra by selecting $\Delta f$ to be substantially greater than $1/T$, a transmitter for sending said long duration signal to distant objects, a receiver for detecting the subspectra of said long duration signal which are reflected from said objects, and a plurality of channels, each of which is selectively responsive to subspectra reflected from objects moving at a predetermined velocity, wherein each of said channels includes means for eliminating subspectra reflected from objects moving at velocities different from the predetermined velocity to which said channel is responsive, means for compressing in frequency the spacing between adjacent subspectra reflected from objects moving at the predetermined velocity to which said channel is responsive to obtain a set of components constituting a single, relatively wide frequency spectrum of width $N/T$, means for shifting the phases of said components by preassigned amounts so that the sum of said phase shifted components defines a signal of relatively short duration.

9. A radar system for determining with high range resolution and high Doppler resolution the range and velocity of distant objects which comprises means for transmitting to distant objects a signal of relatively long duration T having a spectrum characterized by a pair of sets of frequency subspectra, wherein each set of subspectra includes a plurality N of relatively narrow frequency subspectra having a width $1/T$ and a spacing in frequency $\Delta f$ between adjacent subspectra in one set of subspectra and a width $1/T$ and a spacing in frequency $$\left(\Delta f - \frac{1}{T}\right)$$

between adjacent subspectra in said other set of subspectra, means for receiving pairs of sets of subspectra reflected from said objects, a plurality of channels responsive to pairs of sets of subspectra reflected from objects moving at a corresponding plurality of predetermined velocities, each of said channels including a discriminator for selecting pairs of sets of subspectra reflected from objects moving at a predetermined velocity, a spectrum compressor for deriving from each of said selected pairs of sets of subspectra a corresponding group of frequency components defining a single, relatively wide frequency spectrum of width $N/T$, and a signal processor for obtaining from each group of frequency components a signal of relatively short duration.

10. A radar system that comprises a source of a continuous signal having a predetermined frequency $\Delta f$, means supplied with said continuous signal for generating a first set of selected harmonics $\Delta f$, $2\Delta f$, . . . , $N\Delta f$, gating means connected to said generating means for deriving from said first set of harmonics a first train of repetitive pulses of relatively small amplitude and relatively long duration T, where $1/T$ is substantially smaller than $\Delta f$, so that the frequency spectrum of each of said pulses comprises N subspectra, each subspectrum having a uniform width $1/T$ and being separated in frequency from adjacent subspectra by an amount equal to $\Delta f$, means for transmitting said first train of pulses, means for receiving said transmitted pulses after reflection from a plurality of distant moving objects, means responsive to said reflected pulses for selecting those pulses whose subspectra are reflected from an object of a preassigned velocity, means supplied with said selected pulses for compressing the subspectra of said selected pulses on the frequency scale to obtain a second train of pulses having a single, relatively wide frequency of width $N/T$ in which the uniform spacing between adjacent components of said relatively wide spectrum is equal to $1/T$, and phase shifting means connected to said frequency compressing means for substantially shortening the duration and increasing the amplitude of each pulse in said second train of pulses.

11. A radar system that comprises a first source of a first continuous signal having a predetermined frequency $\Delta f$, a second source of a second continuous signal having a predetermined frequency $1/T$, first means supplied with said first continuous signal for generating a first set of selected harmonics $\Delta f$, $2\Delta f$, . . . , $N\Delta f$, second means supplied with both said first continuous signal and said second continuous signal for generating a second set of selected harmonics $$\left(\Delta f-\frac{1}{T}\right),\ 2\left(\Delta f-\frac{1}{T}\right),\ .\ .\ .\ ,\ N\left(\Delta f\frac{1}{T}\right)$$

gating means supplied with said first and second sets of selected harmonics for deriving from said harmonics a first train of relatively short repetitive pulses during a relatively long gating interval of duration T, where $1/T$ is substantially smaller than $\Delta f$, so that the frequency spectrum of said pulses comprises a pair of sets of frequency subspectra, each of said sets of subspectra comprising N relatively narrow subspectra, time dispersion means for increasing the duration of each pulse in said first train of pulses to form a single pulse of relatively long duration T, means for transmitting said long duration pulse to a plurality of objects, means for receiving the plurality of long duration pulses reflected from said plurality of objects, means responsive to said reflected long duration pulses for selecting those of said long duration pulses which are reflected from those of said objects having a preassigned velocity, means supplied with said selected pulses for combining the pair of sets of subspectra of each of said selected pulses to form a corresponding second pulse having a single, relatively wide frequency spectrum that comprises a group of N frequency components separated in frequency from each other by an amount equal to $1/T$, and phase shifting means for substantially shortening the duration of each of said second pulses.

12. A radar system that comprises means for generating a first series of pulses of duration $1/N\Delta f$, and pulse repetition frequency of $\Delta f$ and characterized by a spectrum of width $N\cdot\Delta f$, means for selecting a finite, integral number of said first series of pulses to form a pulse train of length T, where $\Delta f$ is selected to be substantially larger than $1/T$, so that said pulse train is characterized by a spectrum comprising N subspectra each of width $1/T$ and spaced apart at intervals $\Delta f$, time dispersion means for increasing the duration of each pulse in said pulse train by a factor N to form a single, long duration pulse of length T, means for radiating said long duration pulse as a beam of energy to distant objects, means for receiving said long duration pulse after reflection from said objects, means for decreasing the spacing between subspectra of said reflected long duration pulse from $\Delta f$ to $1/T$ to form a long duration pulse characterized by a single spectrum of width $N/T$, and phase shifting means for decreasing the duration of said long duration pulse to develop a short duration pulse.

13. Radar transmission apparatus which comprises a source of a first series of repetitive pulses of duration $$\frac{1}{N}\cdot\Delta f$$

and a pulse repetition frequency $\Delta f$, and characterized by a spectrum of width $N\cdot\Delta f$, means for gating said first series of pulses to form a pulse train of length T containing a finite, integral number of said first series of pulses, where $\Delta f$ and T are chosen to make $\Delta f$ substantially larger than $1/T$ so that said pulse train of length T is characterized by a spectrum comprising N subspectra each of width $1/T$ and spaced apart at intervals of $\Delta f$, time dispersion means for increasing the duration of each pulse in said pulse train by a factor N to produce a single, long duration pulse of length T, and means for radiating said long duration pulse as a beam of energy.

References Cited by the Examiner

UNITED STATES PATENTS

| | | | |
|---|---|---|---|
| 2,624,876 | 1/53 | Dicke | 343—13 |
| 2,834,956 | 5/58 | Harris | 343—14 |

CHESTER L. JUSTUS, *Primary Examiner.*